United States Patent
Street

(10) Patent No.: US 6,394,506 B1
(45) Date of Patent: May 28, 2002

(54) HOSE COUPLING

(75) Inventor: David Gene Street, Pottstown, PA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 16 days.

(21) Appl. No.: 09/650,483

(22) Filed: Aug. 29, 2000

(51) Int. Cl.[7] ............................................. F16L 33/20
(52) U.S. Cl. ....................................................... 285/256
(58) Field of Search ................................. 285/256, 259

(56) References Cited

U.S. PATENT DOCUMENTS

| | | | |
|---|---|---|---|
| 2,410,600 A | * 11/1946 | Cowles | 285/256 X |
| 2,731,279 A | * 1/1956 | Main, Jr. | 285/256 X |
| 3,224,794 A | * 12/1965 | Crissy | 285/256 X |
| 3,539,207 A | 11/1970 | Harris | 285/256 |
| 3,951,438 A | * 4/1976 | Scales | 285/256 X |
| 4,111,469 A | * 9/1978 | Kavick | 285/256 |
| 4,198,079 A | 4/1980 | Shah | 285/245 |
| 4,522,435 A | 6/1985 | Miller et al. | 285/256 |
| 4,548,430 A | 10/1985 | Haubert et al. | 285/256 |
| 4,684,157 A | * 8/1987 | Smith | 285/256 |
| 4,690,435 A | * 9/1987 | Manning et al. | 285/256 |
| 5,370,425 A | 12/1994 | Dougherty et al. | 285/39 |

FOREIGN PATENT DOCUMENTS

| | | | |
|---|---|---|---|
| DE | 4401672 | 7/1995 | F16L/47/04 |
| GB | 2165909 | 4/1986 | F16L/33/22 |
| JP | 2300594 | * 12/1990 | 285/256 X |

* cited by examiner

Primary Examiner—Lynne H. Browne
Assistant Examiner—David E. Bochna
(74) Attorney, Agent, or Firm—Nancy T. Krawczyk

(57) ABSTRACT

An improved hose coupling is disclosed. The coupling is comprised of a fitting and a ferrule to be radially crimped about the end of the fitting, securing a hose end. The coupling is provided with an extension against which the hose end abuts prior to crimping of the coupling. The extension also enables the hose material to flow axially during crimping.

5 Claims, 6 Drawing Sheets

HOSE COUPLING

FIELD OF THE INVENTION

The present invention is related to a coupling for use with a hose. Specifically, the present invention is related to the configuration of the coupling assembly wherein the coupling is provided with means to compensate for the flow characteristics of a hose end during crimping of the coupling.

BACKGROUND OF THE INVENTION

During testing of a fitting formed out of a low strength material, it was discovered that the force generated from crimping the ferrule onto a fitting or coupling shank actually destroyed the shank of the fitting. The hose being crimped produces enough force on the ferrule interlock to push the interlock groove apart on the fitting itself. During crimping, the hose material between the fitting and the ferrule tends to extrude in both directions, creating the problem. Although this extrusion condition exists when crimping hoses onto higher strength fitting materials, the coupling material has adequate strength to prevent movement of the interlock groove.

FIG. 12 illustrates a prior art fitting. Other typical fittings are disclosed in U.S. Pat. Nos. 5,370,425, 4,548,430, 4,522,435, and 3,539,207. The particular illustrated fitting 100 is a male coupling unit of a cam and groove coupling assembly; however, the particular type of assembly in which the fitting is to be employed in is irrelevant for this invention. The stem portion 102 of the fitting 100 is for insertion into a hose 110, see FIG. 13. The stem 102 is characterized by a series of barbs 104 for interacting with the inside of the hose 110 and gripping the hose 110 after a ferrule 112 is crimped onto the stem 102. Adjacent to the series of barbs 104 is an interlock shoulder 106 and an interlock groove 108. The ferrule 112 is placed over the stem 102 and hose 110 such that the interlock shoulder 116 of the ferrule 112 is aligned with the interlock groove 108 of the stem 102. The stem 102 is inserted into the hose 110 until the hose end 114 abuts against the interlock shoulder 106. As discussed above, during crimping of the ferrule 112 onto the hose 110 and stem 102, the pressure forces the hose 110 to extrude in both directions, see FIG. 14. In one direction, the hose 110 extrudes towards, and between, the hose barbs 104, a desired effect assisting in creating a secured attachment. In the other direction, the hose 110 extrudes toward the interlock shoulder 106, an undesired effect that exerts pressure on the interlock shoulder 106, and forces the interlock shoulder 106 toward the ferrule interlock groove 108, and can damage the ferrule interlock shoulder 116, the stem interlock shoulder 106, and the ferrule interlock groove 108, potentially compromising the crimping.

Other fittings have structures which attempt to overcome this problem, for example see U.S. Pat. No. 4,198,079, GB 2165909, DE 4401672. U.S. Pat. No. 4,198,079 obviates the problem by not securing the hose end, permitting the hose to extrude outwardly as the assembly is crimped. GB 2165909 discloses an annular space 35 within the ferrule into which the hose may be extruded as the assembly is crimped. DE 4401672 discloses a stem wherein the groove adjacent to the shoulder against which the hose abuts has a slightly greater depth than the adjacent grooves between the stem barbs.

However, with the assembly of U.S. Pat. No. 4,198,079, the end of the hose may become damaged during use. Concerning the teachings of GB 2165909, the use of a standard ferrule with the assembly is precluded, and can increase the cost of the assembly. The space provided by DE 4401672 might be insufficient to permit the hose material to extrude and can place pressure onto the stem and ferrule, compromising the assembly.

SUMMARY OF THE INVENTION

The present invention is directed toward a fitting constructed so as to prevent possible damage to the fitting during crimping of the hose onto the fitting shank.

The present invention is directed towards an improved fitting for insertion in a hose. The fitting is comprised of an interlock shoulder on the fitting designed to abut an end of the hose and a groove in the body of the fitting, adjacent to the shoulder, for receiving the shoulder of a ferrule when the hose is secured to the fitting by crimping the ferrule in a radially inward direction. The improvement to fitting is characterized by the shoulder having an extension against which the hose abuts prior to crimping. The extension has a recess into which material of the hose can extrude during crimping of the hose.

In another aspect of the invention, the extension of the improved fitting is continuous about the circumference of the fitting. The extension may also be discontinuous about the circumference of the fitting, forming a plurality of extensions about the fitting.

The recesses formed in conjunction with the extensions may be located radially inward of the extension or adjacent to the extensions, the recesses thereby separating the extensions.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
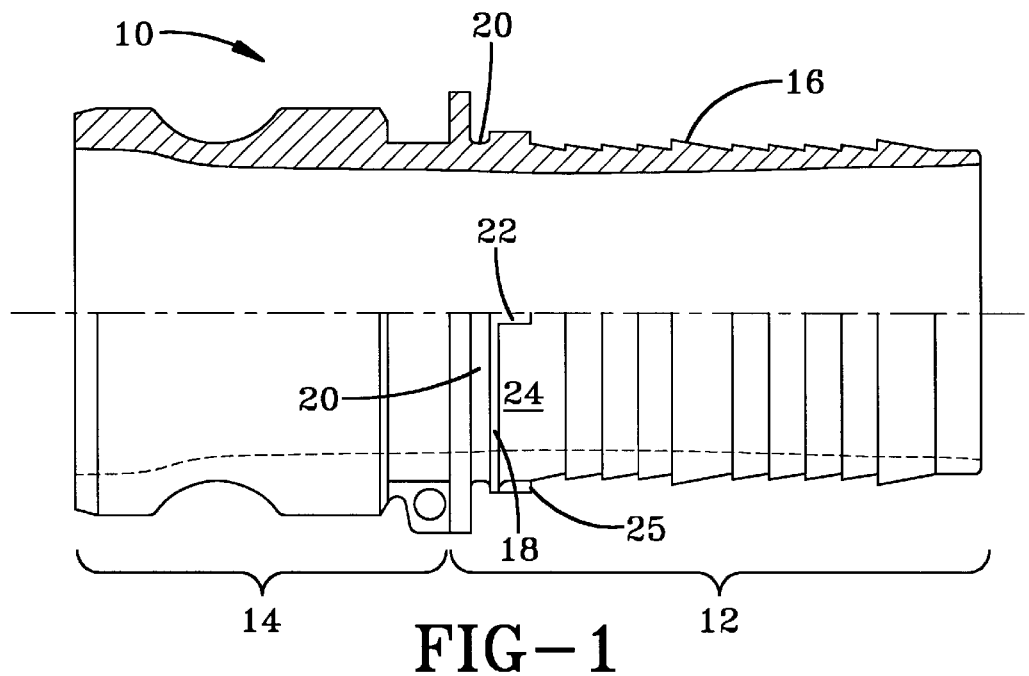
FIG. 1 is a partial cross-sectional view of a fitting in accordance with the present invention.

FIG. 1 illustrates a partial cross-sectional view of a fitting 10 in accordance with the present invention. The illustrated fitting 10 is a male unit of a cam and groove coupling assembly. The particular type of fitting is irrelevant to the present invention and the disclosed invention may be incorporated into any fitting that is inserted into a hose end. With reference to the fitting of FIG. 1, the right hand side of the fitting 10 is the shank portion 12, while the left hand side is the cam and groove portion 14 and is particular to a cam and groove coupling assembly.

The shank 12 has a series of barbs 16 extending along the majority of its length. Adjacent to the barbs 16 and approximately mid-length of the fitting 10 is an interlock shoulder 18. Adjacent to the shoulder 18, on the opposite side of the interlock shoulder 18 from the barbs 16, is an interlock groove 20.

In accordance with the first embodiment of the present invention, extending from the interlock shoulder 18 is a series of extensions 22, forming recesses 24 between the extensions 22. Each extension 22 has a similar radial diameter as the interlock shoulder 18 so that a ferrule may slip over the extensions 22 during assembly of a hose and fitting 10. In the illustrated embodiment, the extensions 22 are spaced along the circumference of the fitting 10 and extend along the length of the fitting away from the interlock shoulder 18. The recesses 24 formed between the extensions 22, having a radial diameter equal or less than the inside diameter of the hose, provides an area for the hose to extrude into when the hose is crimped onto the fitting shank 12.

The fitting 10 is illustrated as having four equally spaced extensions 22. The fitting 10 should be provided with at least one extension 22. For this embodiment, the fitting 10 is preferably provided with two to eight extensions 22. Because the location of the interlock shoulder 18 and the diameter of the fitting 10 over which the ferrule 30 must pass has not changed, a conventional ferrule 30 may be used in this embodiment of the present invention.

Figure 2:
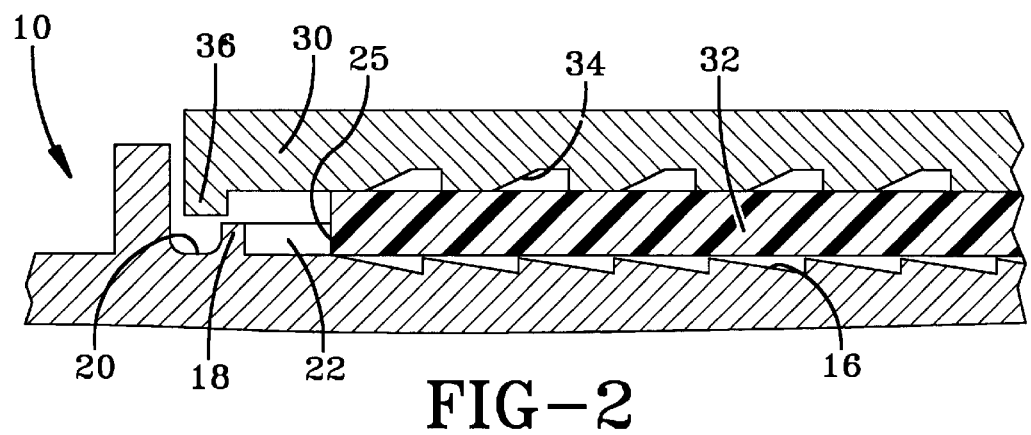
FIG. 2 is a partial cross-sectional view of a coupling assembly prior to crimping.
Figure 3:
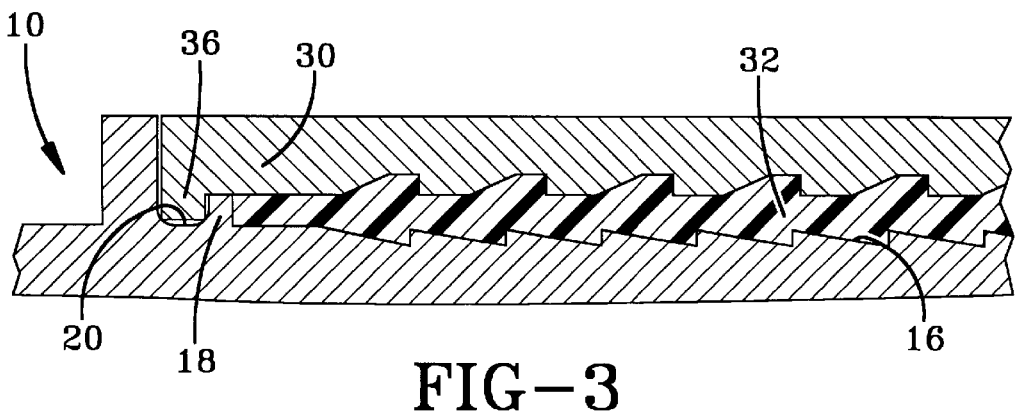
FIG. 3 is a partial cross-sectional view of a coupling assembly after crimping.

Assembly of the fitting 10 comprising the present invention is illustrated in FIGS. 2 and 3. The ferrule 30 is either slid onto the end of the hose 32 or the fitting 10, and then the hose 32 is then slid onto the fitting 10 until the hose 32 abuts against the axially outer end 25 of the extension 22. The ferrule 30 is then moved to position the ferrule interlock shoulder 36 over the interlock groove 20 or inspected to assure that the ferrule 30 is in the proper location for crimping. The ferrule 30 is then crimped in the usual manner, interlocking the ferrule interlock shoulder 36 into the interlock groove 20 and compressing the hose 32 into the fitting barbs 16 and the barbs 34 on the underside of the ferrule 30. As the hose 32 is crimped, the hose 32 flows axially forward into the recesses 24, and radially outwards and radially inwards into the fitting barbs 16 and the ferrule barbs 34. While the illustrated ferrules 30 have barbs 34, it will be understood by those in the art that the underside of the ferrule 30 may be smooth bored or provided with grooves.

Although there may still be some force exerted on the interlock groove 20 when the hose 32 is crimped onto the fitting 10, it is substantially reduced as the surface area, i.e., only the extension end 25, on which the end of the hose 32 may push is reduced. The presence of the extensions 22 on the shank 12 does not prevent the use of other methods of hose attachment, such as band clamps, should the assembler be so inclined to use such methods.

The extensions 22 and recesses 24 may be cast in the raw casting from which the fittings 10 are produced. Therefore, there is little to no extra cost in manufacturing the fitting 10. If fittings are already produced, hose extensions 22 may be machined into the fittings, effectively retrofitting the conventional fittings into fittings 10 in accordance with the invention. Another alternative is producing another piece to retrofit the conventional fitting, or use a ferrule made in accordance with the present invention as discussed below.

Figure 4:
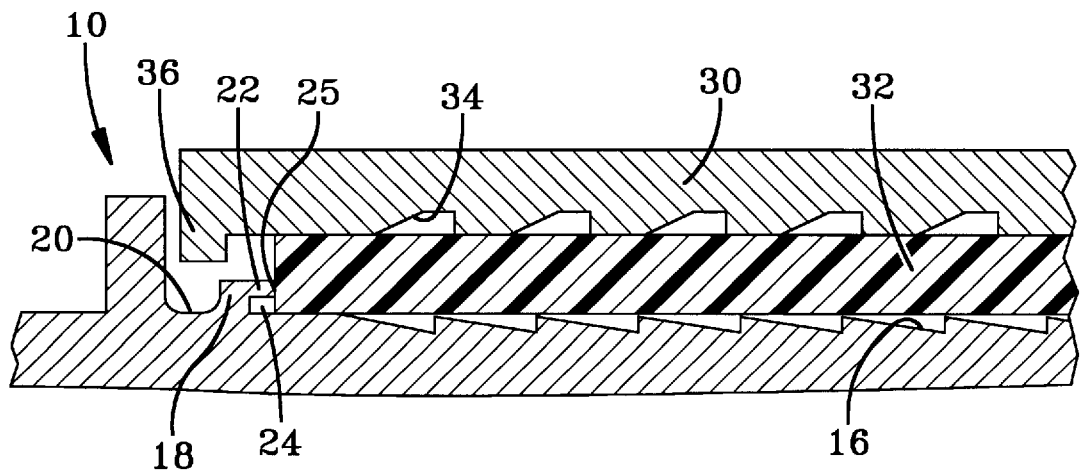
FIG. 4 is a partial cross-sectional view of a coupling assembly prior to crimping wherein the fitting is in accordance with a second embodiment of the present invention.
Figure 5:
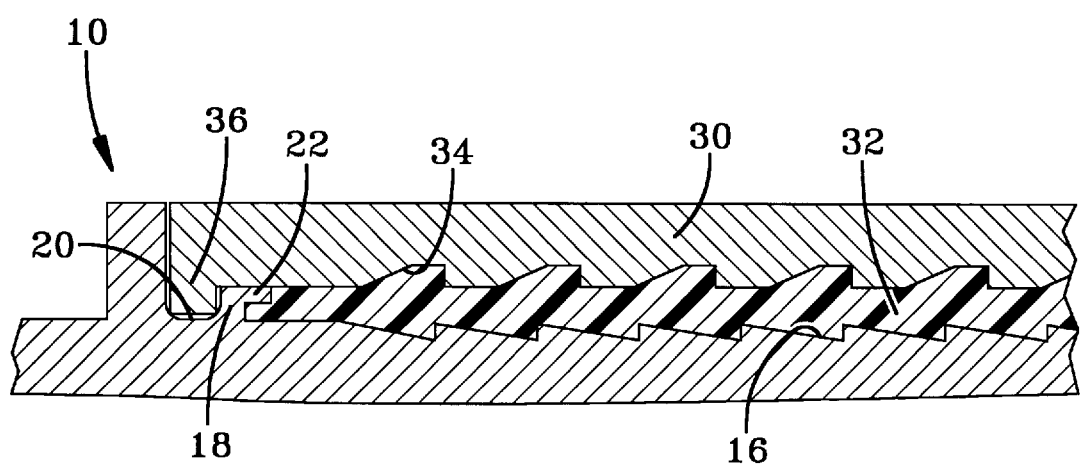
FIG. 5 is a partial cross-sectional view of the second embodiment of the coupling assembly after crimping.

FIGS. 1 and 2 illustrate the extensions 22 as discrete extensions spaced about the circumference of the fitting 10. However, the extensions 22 may be of a different construction, so long as the fitting provides for a space for the rubber of the hose 32 to flow axially into during crimping. In a second embodiment of the fitting, as illustrated in FIGS. 4 and 5, the extension 22 extends out from the interlock shoulder 18 and has an undercut, creating a recess 24 into which the hose 32 flows during crimping. When the extension 22 is formed in this manner, the extension 22 may be continuous about the outer circumference of the fitting 10 or the extension 22 may be discontinuous, similar to the extensions 22 of the first embodiment. Likewise, the recess 24 formed under the extension 22 may be continuous or discontinuous.

Figure 6:
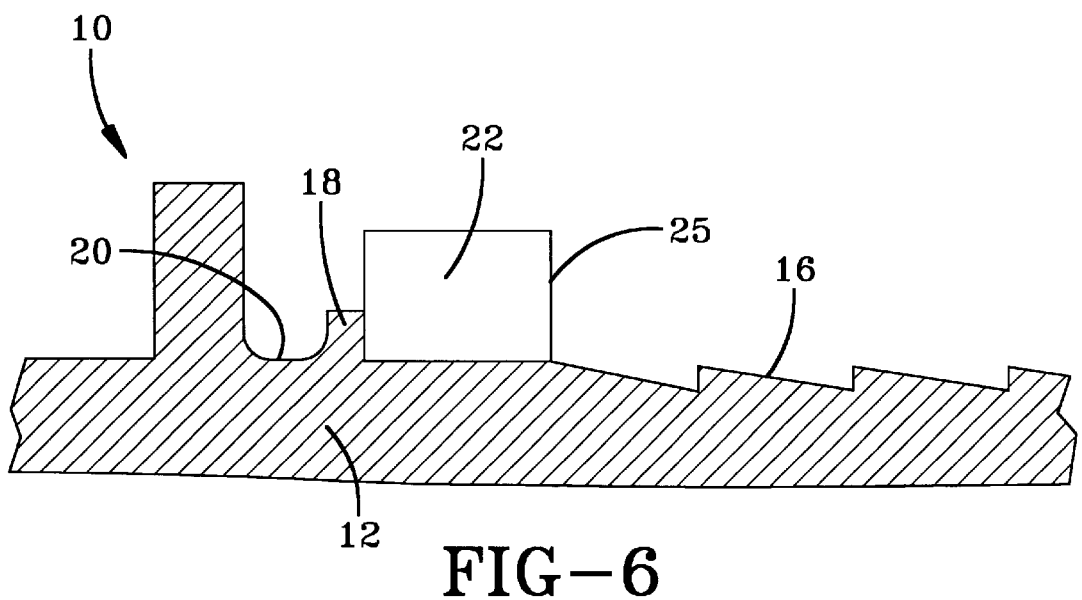
FIG. 6 is a partial cross-sectional view of a third embodiment of a fitting.
Figure 7:
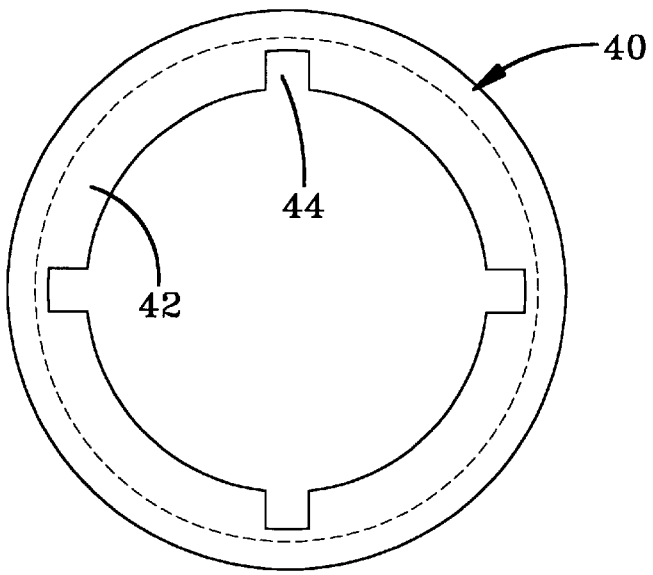
FIG. 7 is a cut through view of a ferrule for the fitting of the third embodiment.

FIG. 6 illustrates a third embodiment of the present invention, similar to the first embodiment. The extensions 22 have a radial height greater than the interlock shoulder 18, and are discontinuous about the circumference of the fitting shank 12, creating a series of recesses into which the hose material axially flows during crimping of the coupling assembly. Because the extensions 22 have a height greater than the interlock shoulder 18, a non-conventional ferrule 40, see FIG. 7, must be used with this embodiment. The ferrule 40 has a series of notches 44 cut out of the interlock shoulder 42. The width of the notches 44 is at least as wide as the extensions 22 to permit the ferrule 40 to pass over the extensions 22. After the ferrule 40 has been inserted onto the fitting 10, the ferrule 40 may be turned to prevent the ferrule 40 from removing itself from the fitting 10 prior to crimping.

The first two embodiments of the present invention, a coupling assembly that provides means for the hose to flow into during crimping of a ferrule onto a fitting, are directed to a modification of the fitting alone, and the third embodiment is achieved with a modification to both the fitting and the ferrule, the goals of the present invention may also be achieved by a new construction for the ferrule alone, as illustrated in FIGS. 8–11.

Figure 8:
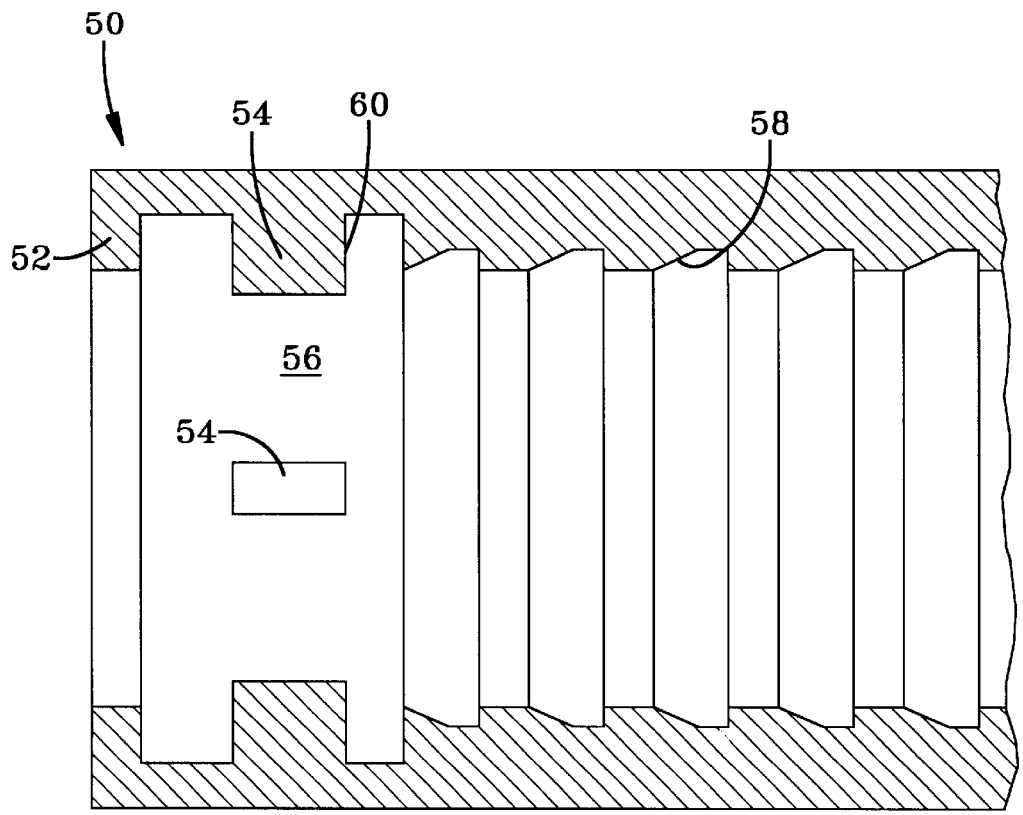
FIG. 8 is a cross-sectional view of a ferrule in accordance with the present invention.

FIG. 8 illustrates a ferrule 50 modified to provide recesses into which hose material can flow into during crimping. The ferrule 50 has an interlock shoulder 52 at one end. Spaced from the interlock shoulder 52 is a series of extensions 54, the extensions 54 forming a series of recesses 56. Spaced from the extensions 54 and recesses 56 are a series of barbs 58.

Figure 9:
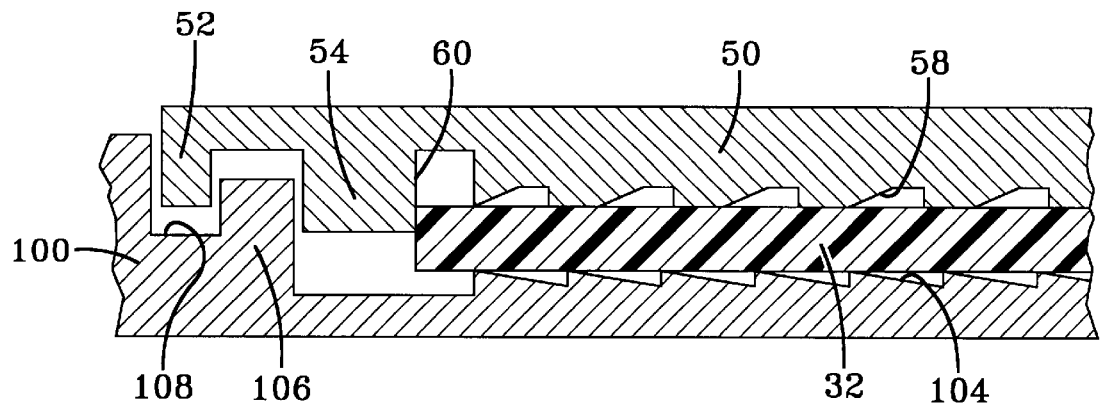
FIG. 9 is a partial cross-sectional view of the ferrule of FIG. 8 prior to crimping the coupling.

When the coupling is assembled using the ferrule 50, a conventional fitting 100 may be used. The assembly of the coupling using the ferrule 50 is illustrated in FIG. 9. The ferrule 50 is either slid onto the end of the hose 32 or the fitting 100. If the ferrule 50 is slid first onto the hose, than the ferrule 50 is slid over the hose 32 until the hose 32 abuts against the axially outer end 60 of the extension 54; the fitting 100 is then inserted into the hose to position the ferrule interlock shoulder 52 over the interlock groove 108 or inspected to assure that the ferrule 50 is in the proper location for crimping. If the ferrule 50 is first slid over the fitting 100, the ferrule 50 is position so that the ferrule interlock shoulder 52 is over the interlock groove 108. The hose 32 is then slid in between the ferrule 50 and the fitting 108 until the hose abuts against the axially outer end 60 of the extension 54. The ferrule 50 is then crimped in the usual manner, interlocking the ferrule interlock shoulder 52 into the interlock groove 108, compressing the hose 32 into the fitting barbs 104 and the ferrule barbs 58. As the hose 32 is crimped, the hose 32 flows axially forward into the recesses 56, and radially outwards and radially inwards into the fitting barbs 104 and the ferrule barbs 58.

Figure 10:
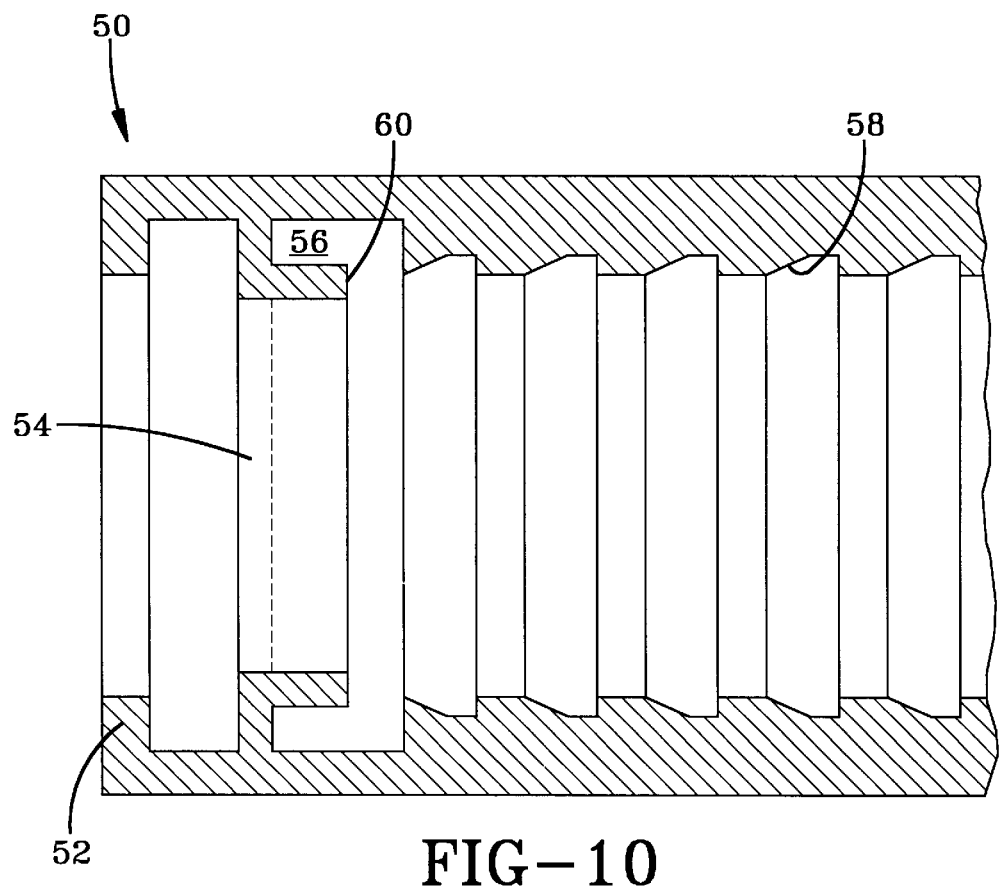
FIG. 10 is a cross sectional view of another ferrule made in accordance with the present invention.
Figure 11:
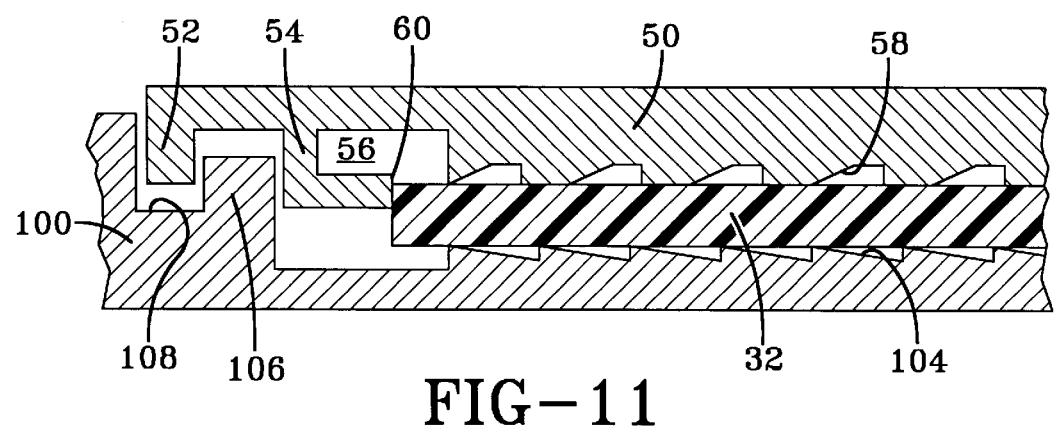
FIG. 11 is a partial cross-sectional view of the ferrule of FIG. 10 prior to crimping the coupling.
Figure 12:
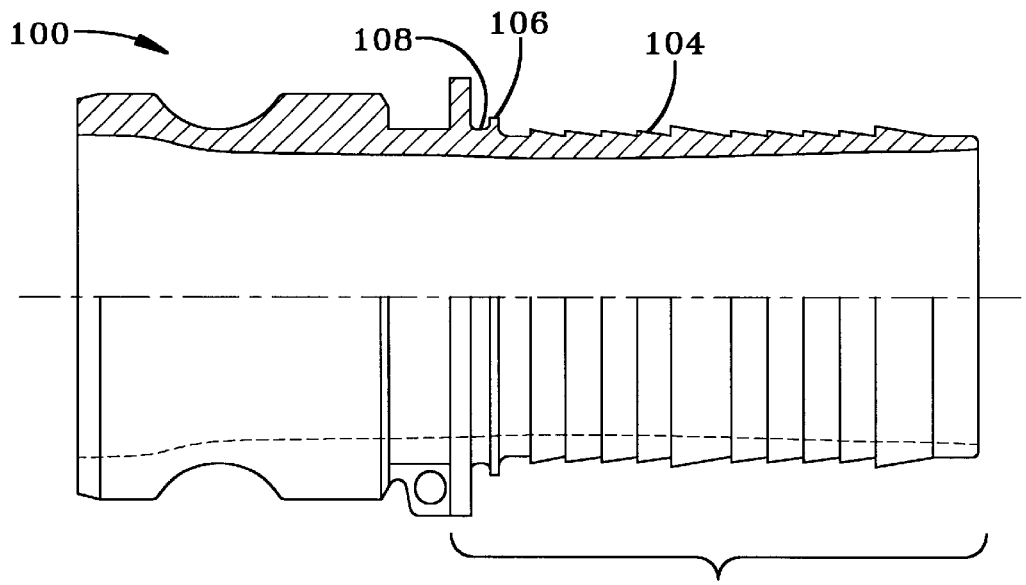
FIG. 12 is a partial cross-sectional view of a prior art fitting.
Figure 13:
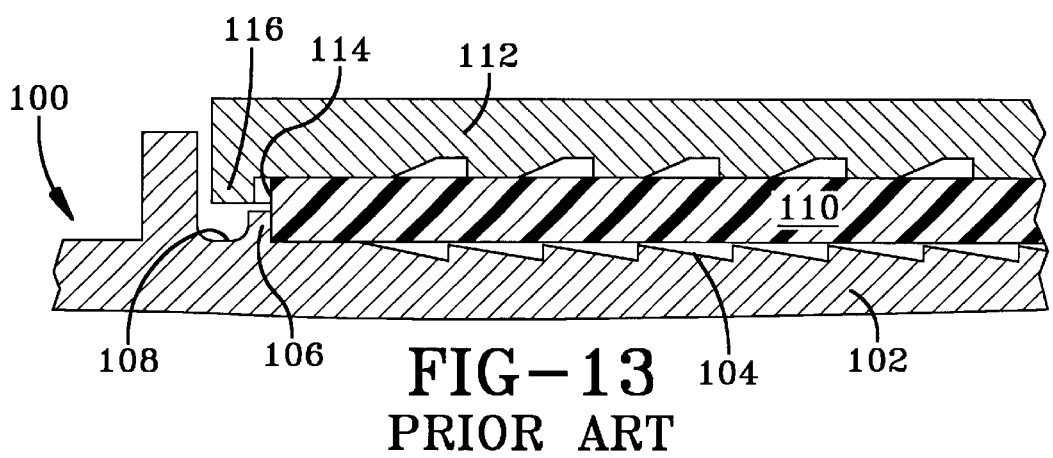
FIG. 13 is a partial cross-sectional view of a prior art fitting prior to crimping.
Figure 14:
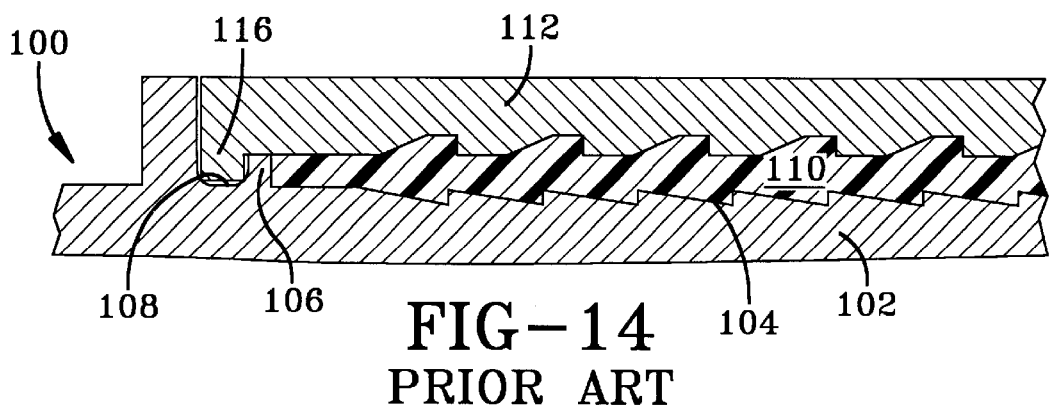
FIG. 14 is a partial cross-sectional view of a prior art fitting after assembly.

FIGS. 10 and 11 illustrate another embodiment of the ferrule 50 modified to provide a recess into which hose material can flow into during crimping. The ferrule 50 has an interlock shoulder 52 at one end. Spaced from the interlock shoulder 52 is an extension 54. The extension 54 has an undercut to form a recess 56. When the extension 54 is formed in this manner, the extension 54 may be continuous about the inner circumference of the ferrule 50 or the extension 54 may be discontinuous, similar to the extensions 54 of the first ferrule embodiment. Likewise, the recess 56 formed may be continuous or discontinuous.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications, and variations as fall within the spirit and scope of the appended claims.

What is claimed is:

1. A coupling comprising a fitting for insertion in a hose end and a ferrule to crimp the fitting onto the hose, the ferrule comprising a radially inward extending shoulder, the fitting comprising an interlock shoulder and a groove adjacent to the shoulder, wherein during assembly of the coupling, the ferrule shoulder passes over the fitting interlock shoulder, and the ferrule shoulder is received in the fitting groove when the hose is secured to the fitting by crimping the ferrule in a radially inward direction, the coupling being characterized by;

the fitting having an axial extension extending from the shoulder in a direction away from the groove against which the hose end abuts prior to crimping preventing the hose end from contacting the fitting shoulder prior to crimping the ferrule and permitting the material of the hose to flow axially during crimping of the hose.

2. A coupling in accordance with claim 1 wherein the extension is continuous about the circumference of the fitting.

3. A coupling in accordance with claim 2 wherein a recess is located radially adjacent to the extension.

4. A coupling in accordance with claim 1 wherein the extension is discontinuous about the circumference of the fitting forming a series of recesses.

5. A coupling in accordance with claim 4 wherein the extension has a radial height greater than the radial height of the shoulder.

\* \* \* \* \*